United States Patent [19]

Blake

[11] 4,232,049

[45] Nov. 4, 1980

[54] CITRUS JUICE VESICLE CONTAINING FROSTING COMPOSITIONS AND METHOD OF PREPARATION

[75] Inventor: Jon R. Blake, Brooklyn Center, Minn.

[73] Assignee: General Mills, Inc., Minneapolis, Minn.

[21] Appl. No.: 44,799

[22] Filed: May 31, 1979

[51] Int. Cl.$^2$ ............................................... A23L 1/34
[52] U.S. Cl. .................................. 426/572; 426/616; 426/659
[58] Field of Search ............... 426/333, 616, 639, 658, 426/660, 661, 506, 519, 523, 810, 572, 659

[56] References Cited

U.S. PATENT DOCUMENTS

| | | | |
|---|---|---|---|
| 2,846,314 | 8/1958 | Aichele et al. | 426/572 X |
| 2,858,221 | 10/1958 | Laurie | 426/616 |
| 2,865,757 | 12/1958 | Aurell | 426/558 X |
| 2,952,548 | 9/1960 | Work | 426/302 X |
| 2,965,493 | 12/1960 | Mancuso et al. | 426/572 |
| 3,190,756 | 5/1965 | Aurell | 426/653 X |
| 3,196,020 | 7/1965 | Work | 426/302 |
| 3,199,988 | 8/1965 | Kozlik et al. | 426/572 X |
| 3,246,993 | 4/1966 | Webster et al. | 426/616 |
| 3,365,310 | 1/1968 | Webster | 426/616 |
| 3,464,830 | 9/1969 | Wahba | 426/572 |
| 3,656,972 | 4/1972 | Blomberg | 426/572 X |
| 3,814,816 | 6/1974 | Gunther | 426/46 |
| 3,998,977 | 12/1976 | Rabeler | 426/616 X |
| 4,096,286 | 6/1978 | Sakakibara et al. | 426/577 |
| 4,117,176 | 9/1978 | Taylor et al. | 426/660 |
| 4,120,987 | 10/1978 | Moore | 426/572 |
| 4,135,005 | 1/1979 | Cheng | 426/572 X |

OTHER PUBLICATIONS

Ting, "Alcohol-Insoluble Constituents of Twice Vesicles of Citrus Fruit", *Journal of Food Science*, vol. 35, pp. 757-761 (1970).

Nagy et al, "Fatty Acids of Triglycerides From Citrus Juice Sacs", *Phytochemistry*, vol. 13, pp. 153-154, (1974).

Nagy et al, "Saturated & Mono-Unsaturated Long Chain Hydrocarbon Profiles of Lipids From Orange, Grapefruit, Mandarin & Lemon Juice Sacs", *Lipids*, vol. 7, No. 10, pp. 666-670 (1972).

Kesterson et al, "Processing & Potential Uses for Dried Juice Sacs", *Food Technology*, pp. 52-54, Feb. 1973.

*Primary Examiner*—Arthur L. Corbin
*Attorney, Agent, or Firm*—Gene O. Enockson; John A. O'Toole

[57] ABSTRACT

Disclosed are frosting compositions which are substantially free of emulsified oleaginous materials yet exhibit the organoleptic attributes of creme icings. The frosting compositions comprise a comestible base prepared in prescribed manner, and minor amounts of both an acid-stable whipping agent and polysaccharide gum. The comestible base is prepared by cooking a blend comprising citrus juice vesicles, a nutritive carbohydrate sweetening agents, an ungelatinized starch, an edible organic acid to provide a pH between 2.5 to 5.5 and water. The cooking yields a base having a moisture content between 30% to 60% and a viscosity between 7,000 to 10,000 cp. The frosting compositions upon aeration provide frostings having a density between 0.6 to 0.8 g./cc.

16 Claims, No Drawings

CITRUS JUICE VESICLE CONTAINING FROSTING COMPOSITIONS AND METHOD OF PREPARATION

BACKGROUND OF THE INVENTION

1. Field of the Invention

The present invention relates to food products. More particularly, the present invention relates to frosting compositions which can be aerated to form frosting or icings.

2. The Prior Art

Frostings are well known in the food art. Of the several types of frostings, the more popular include creme icings and fluffy frostings. Creme icings typically comprise sugar, shortening usually with emulsifiers, and water in a shortening-water-air emulsion. Optional ingredients for creme icings include flavors, coloring agents, proteinaceous materials and bodying agents. Such icings desirably exhibit a rich and creamy mouthfeel due, in part, to the high levels of shortening employed, typically from about 10% to 20% (see, for example, U.S. Pat. No. 3,464,830, issued Sept. 2, 1969 to I. J. Wahba). The organoleptic properties also importantly depend on the physical properties of the icings, e.g., the density which typically exceeds 1.1 g/cc. Such densities indicate relatively low aerations.

Highly aerated edible toppings are generally referred to as "fluffy frostings." These fluffy frostings typically have densities of less than about 0.4 g./cc. Such highly aerated compositions are generally fat-free, and depend on the whippability of material such as egg whites, gelatins, enzymatically degraded soy whipping proteins or certain polyglycerol esters of higher fatty acids.

Such frostings can also comprise sugar, water and optionally a wide variety of foam stabilizers such as algin, gelatin or a cellulosic derivative, such as carboxymethyl cellulose. Fluffy frostings have a unique, desirable mouthfeel and eating quality provided by the high level of aeration.

A primary disadvantage possessed by conventional frostings is their instability over a period of time. For example, it is well known that fluffy frostings, although highly aerated and of desirable eating quality when fresh, generally lose air and/or liquid and become rubbery or marshmallow-like upon storage or while standing on a cake overnight. This disadvantage is seen in both homemade fluffy frostings and in currently available mix products. This instability characteristic also explains why "ready-to-spread" prepared fluffy frostings have not been made commercially available.

It would be desirable to have an edible topping which combined the desirable attributes of both creme icings which contain shortening such as a creamy, rich mouthfeel and also the attributes of fluffy frostings which are fat-sparing, such as their unique lightness. Thus, there is a continuing need for fat-sparing frosting compositions which provide frostings having the organoleptic properties of creme icings yet exhibiting substantially greater aeration. Accordingly, it is an object of the present invention to provide frosting compositions which upon aeration realize low density fat-sparing frostings which nonetheless exhibit the eating qualities of cream icings.

It is a further object of the present invention to provide frosting compositions having enhanced stability against both air loss and syneresis.

It is a further object of the present invention to provide creamy frostings which require neither conventional shortening nor emulsifiers.

It has been surprisingly discovered that the above objectives can be realized and superior frosting provided by frosting compositions comprising a specially prepared comestible base and minor amounts of an acid-stable whipping agent and an acid-stable polysaccharide gum.

The present, particular comestible bases which are the principal ingredient of the present frosting compositions are prepared in accordance with the method of preparation of copending application, Ser. No. 043,993 filed concurrently herewith. Such comestible bases are prepared by cooking in prescribed manner uncooked blends which comprise nutritive carbohydrate sweetening agents, ungelatinized starch, edible non-volatile organic acids and principally citrus juice residual juice vesicles.

Citrus juice residual juice vesicles are a by-product of commercial citrus juice preparation. Juice vesicles can be obtained from the finer materials (i.e., pulp) associated with the juice which is segregated from the juice by screening. A variety of terms have been loosely used in the art to refer to this pulp material or parts thereof in its untreated forms. It has been called at various times in its untreated state, "juice vesicles," "juice sacs," or "finisher pulp." The juice vesicles are the membranes forming the juice sacs of the citrus fruit. During juicing operations, the juice sacs rupture and release their juice. Thus, for purposes of the present invention, "juice vesicles" is used synonymously for the residual citrus juice sac materials remaining after the release of the juice from the juice sac.

The finisher pulp typically is combined with the peel residue and the mixture is used for cattle feed since the pulp is not a good source of pectin compared to the peel itself. In some instances, the pulp is recovered, frozen and even freeze-dried to be used in dry juice powders which form orange juice drinks when reconstituted with water (see, for example, U.S. Pat. No. 3,246,993 issued Apr. 19, 1966 to R. C. Webster et al and U.S. Pat. No. 3,365,310 issued Jan. 20, 1968 to R. C. Webster).

In commercial juice production, the pulp is washed to recover cold water soluble sugars which are present in the pulp material in dilute amounts. Although the cold water soluble sugars are initially present in relatively high concentrations on a dry solids basis, 3.5% to 30% by weight, on a wet basis the sugars concentration is quite low since the total solids content of the finisher pulp is only 3% to 5%. Some pectin-like materials are also washed away along with the soluble sugars to leave a material referred to as "washed juice vesicles."

Both washed and unwashed juice vesicle material which has been drum dried, spray dried or solvent dried has been suggested for use as a food additive. Such suggested utilization is based upon the excellent water-binding and the good oil-binding properties of the material. One reference (see, "Processing and Potential Uses for Dried Juice Sacs," by J. W. Kesterson and R. J. Braddock, *Food Technology*, February 1973, pp. 52–54) suggests its utilization in a wide variety of food products but has no teaching of actual use in any food product. However, the present invention does not contemplate the employment of dried juice vesicle material as an essential ingredient of the present comestible base component.

Past efforts have also included attempts at utilizing dried "protopectin" derived from citrus residue including juice vesicles. "Protopectin" is a non-specific term generally denoting insoluble pectinaceous material. For example, several art efforts have been made at incorporating small amounts of dried or treated protopectin into breads or cakes (see U.S. Pat. No. 2,952,548 issued Sept. 13, 1960 to L. T. Work; U.S. Pat. No. 3,190,756 issued June 22, 1965 to W. Aurell; and U.S. Pat. No. 3,196,020 issued July 20, 1965 to W. Aurell). These patents disclose elaborately treating the protopectin with various lipids or colloid materials to decrease the rate or amount of hydration of the protopectins. Without such treatment, these patents teach that the rapid hydration of these extremely hydrophilic materials causes doughs or batters to set quickly into non-elastic solid masses which are unsuitable for bread or cake production. Alternatively, it has been taught that cakes containing untreated protopectin can be realized by formulating doughs of low gluten flours such as potato flour. (See, for example, U.S. Pat. No. 2,865,757 issued Dec. 23, 1958 to W. Aurell). Again, dried "protopectin", although derived from residual juice material, is not contemplated herein as an essential ingredient of the present comestible base component.

Thus, given the above-described problems and difficulties in providing any food products containing even minor amounts of any residual citrus material, it is not surprising that few art attempts have realized actual food products which comprise major amounts of the specific material juice vesicle solids.

Moreover, while raw citrus pulp has been employed in non-analogous foods (see U.S. Pat. No. 2,858,221, issued Oct. 28, 1958 to D. C. Laurie), the art generally teaches the usage of dried residual citrus fruit material as an additive ingredient in food products. Surprisingly, the present invention employs juice vesicles in the present fat-sparing frostings. More surprisingly, the present frosting compositions employ juice vesicles which have not been dried.

SUMMARY OF THE INVENTION

The present invention relates to frosting compositions which upon aeration or whipping by the user realize frostings exhibiting both the desirably rich mouthfeel of creme icings as well as the lightness of fluffy frostings. These frosting compositions are substantially free of emulsified oleaginous material. The present frosting compositions comprise from about 90% to 98% by weight of a comestible base, from about 0.4% to 3% of an acid-stable whipping agent and from about 0.1% to 0.5% by weight of an acid-stable polysaccharide gum.

The comestible base which forms the major portion of the present frosting compositions is prepared by forming an uncooked blend comprising citrus juice vesicles, a nutritive carbohydrate sweetening agent, ungelatinized starch, sufficient edible non-volatile acid to provide the blend with a pH of between 2.5 and 5.5, and water. The blend is then cooked at a temperature between about 180° F. to 280° F. to form a cooked comestible base characterized by a final moisture content of between 30% to 60% and a viscosity (190° F.) between 7,000 and 10,000 cp. The uncooked blend contains from about 25% to 65% by weight of the vesicles, from about 7% to 45% of the sweetening agent, from about 1% to 5% of the ungelatinized starch and from about 8% to 60% by weight of the water.

The frostings provided by the present invention are characterized by a density between 0.6 to 0.8 g./cc. The frostings exhibit exceptional foam stability with respect to both air and liquid loss from the frosting foam.

DETAILED DESCRIPTION OF THE INVENTION

The present invention relates to fat-sparing frosting compositions which upon aeration nonetheless exhibit the desirable organoleptic qualities of shortening-based frostings while still exhibiting the desirable lightness of fluffy frostings. The present frosting compositions essentially comprise a specially prepared comestible base, an acid-stable whipping agent, and an acid-stable polysaccharide gum. Each of these frosting composition ingredients as well as product preparation and product use are described in detail below.

Throughout the specification and claims, percentages and ratios are by weight and temperatures in degrees Fahrenheit, unless otherwise indicated.

A. Comestible Base

A comestible base containing citrus juice vesicle solids is the principal component of the present frosting compositions. The present frosting compositions essentially comprise from about 90% to 98% of the comestible base. Better results are achieved when the present compositions contain from about 95% to 98% of the comestible base. Best results are achieved when the comestible base comprises about 97% to 98% of the present compositions.

It is essential to the practice of the present invention that the comestible base is prepared according to the following method:

I. Blend Preparation

A process blend is prepared essentially comprising the following:

a. Juice Vesicles

Citrus juice vesicles are the principal component of the presently prepared blend. After cooking the blend as described in detail below and combining the cooked comestible base with the other essential frosting composition ingredients, the juice vesicles provide the structuring and bulk to the present frostings, upon aeration. The juice vesicles are present in amounts of from about 25% to 65% by weight of the uncooked blend. Superior results in terms of structuring ability, for example, are achieved when the vesicles are present at from about 40% to 55%. Best results are obtained when the vesicles are present at from about 47% to 53% of the uncooked blend.

Juice vesicles generally contain 89% to 96% moisture. Thus, when only the solid materials provided by the juice vesicles is considered, the juice vesicles comprise about 2.5% to 6.5% of the present comestible base, preferably about 4.0% to 5.5%, and most preferably about 4.7% to 5.3%.

As noted supra, the juice vesicles have been separated from the juice by simple screening in the manufacture of concentrated citrus juice. Usually, juice vesicles are washed with cold water to remove and to recover some of the soluble sugars. Some pectin-like materials are also washed out along with the soluble sugars leaving relatively pure juice vesicles. Optionally, the juice vesicles are pasteurized by heating at 180° F. or higher for 0.25 hours or longer. Such heating also serves to stabilize the juice vesicles, i.e., to inactivate pectillic enzymes present in the juice vesicles.

Citrus juice vesicles and their chemistry of composition are well known (see, for example, "Alcohol-Insoluble Constituents of Juice Vesicles of Citrus Fruit," by S. V. Ting, *Journal of Food Science,* Vol. 35, pp. 757–761, 1970); "Fatty Acids of Triglycerides From Citrus Juice Sacs," by S. Nagy and H. E. Nordly *Phytochemistry,* Vol. 13, pp. 153–154, 1974; or "Saturated and Mono-Unsaturated Long Chain Hydrocarbon Profiles of Lipids from Orange, Grapefruit, Mandarin and Lemon Juice Sacs" by S. Nagy and H. E. Nordly, *Lipids,* Vol. 7, No. 10, pp. 666–670, 1972, each of which is incorporated herein by reference).

A typical analysis of citrus juice vesicles useful in the present food composition is:

TABLE I

| Component | Percent (dry basis) |
|---|---|
| Crude fiber | 33.0% |
| Pectin | 36.0% |
| Sugar | 16.5% |
| Protein | 10.0% |
| Ash | 2.75% |
| Fat | 1.75% |
| | 100.00% |

Although the moisture contents of juice vesicles are quite high, the water is tightly bound and not readily removed by mechanical means such as conventional filtration. Juice vesicles having moisture contents below about 89% obtained by partially thermally drying are not contemplated for use herein. While the precise phenomenon is not understood, it is believed that drying of the juice vesicles irreversibly alters their structure and composition rendering them unsuitable for use in the present comestible bases as prepared by the present preparation method. And too, attempts at substituting of juice vesicles by equivalent amounts of individual materials similar to the component analysis of Table I have not proven successful.

In a preferred embodiment of the present frosting compositions, it is highly desirable to employ homogenized juice vesicles in the preparation of the comestible base ingredient. Homogenized juice vesicles can be prepared using conventional homogenization methods and apparatus. Generally, homogenizers are divided into two groups according to the kind of energy introduced to the medium homogenized: (1) rotor or rotor-stator system, e.g., agitators, emulsifying pumps and colloid mills, and (2) pressure systems, e.g., wedge resonators and pressure homogenizers. The pressure homogenizer is predominantly used in food processing since it has the best homogenizing effects. Preferably, such units which are used in the preparation of the homogenized juice vesicles usefully employed in the present comestible bases are those homogenizers which are constructed to prevent contamination. Typically, juice vesicles are easily homogenized employing low to high homogenization pressures, e.g., 1,000 to 8,000 p.s.i.g.

Unfortunately, homogenized juice vesicles are not readily amenable to analysis of their particle size distribution due to their partially dissolved/suspended nature and their high viscosity. Sufficient homogenization for the present invention is achieved, however, when the homogenized juice vesicles' taste preception is particle-free or homogeneous, e.g., similar texturally to ketchup. Mixtures of juice vesicles and the chemically similar material obtained from citrus fruit albedo can be homogenized to supply the homogenized juice vesicles component herein, since the physical structure of neither the albedo material nor the juice vesicles is retained after homogenization.

Juice vesicles derived from citrus fruits are especially suitable for use herein. Preferably, the vesicles are derived from oranges, but lemon, grapefruit, tangerine or mandarin juice vesicles can also be used.

b. Sweetening Agent

A nutritive carbohydrate sweetening agent is essentially present in the present uncooked blend at about 7% to 45%, preferably at from about 25% to 45% and most preferably from about 35% to 42% by weight. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate, and the like. Additionally, the present carbohydrate sweetening agents are to be distinguished from such protein-based sweetening agents are aspartame, thaumatin and monellin.

Suitable materials for nutritive carbohydrate sweetening agents are well known in the art. Examples of such sweetening agents include both monosaccharide and disaccharide sugars such as sucrose, invert sugar, dextrose, lactose, honey, maltose, fructose, maple syrup and corn syrup solids. Preferred nutritive carbohydrate sweetening agents are selected from the group consisting of sucrose, glucose, fructose, corn syrup solids and honey. Highly preferred nutritive carbohydrate sweetening agents are selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder (or apple powder as it is commercially labeled) which is approximately 70% by weight (dry basis) sugars can be employed as a nutritive sweetening agent. If used, such impure sources of sugars are employed at levels based upon their total sugars content. Examples of other suitable materials of this kind include dry fruit, semimoist fruit, fruit purees, fruit juice and fruit nectars. Up to 25% of the nutritive carbohydrate sweetening agent used herein can be supplied by such impure sweetening agents.

c. Acidulants

An edible non-volatile organic acid is another essential ingredient of the uncooked blend. The edible organic acid serves to provide the uncooked blend with a pH of from about 2.5 to about 5.5, preferably from about 3.0 to about 4.3 and most preferably from about 3.8 to about 4.2. Maintenance of the pH of the present uncooked blend within the above-noted range is essential to the complex vesicle-starch interaction of the present method of preparation. Typically, edible organic acids are employed at levels of from about 0.3% to 4% by weight of the present culinary base.

The present method of comestible base preparation involves cooking the uncooked blend at elevated temperatures for extended periods. Thus, it is essential that the acidulant remain in the blend during the cooking operation rather than being lost through vaporization. Accordingly, the organic acids useful herein should be non-volatile. For purposes of the present invention, non-volatile shall mean having a vapor pressure at 280° F. of less than about 50 Torr.

A wide variety of edible non-volatile organic acids or their sodium salts are known in the food art and are usefully employed herein. Examples of suitable materials useful herein as edible organic acids include citric acid, succinic acid, tartaric acid, malic acid, lactic acid, itaconic acid and adipic acid. Preferred edible non-volatile organic acid salts include sodium citrate and sodium succinate.

d. Ungelatinized Starch

The present uncooked blends also comprise from about 1% to 5% of ungelatinized starch. Better compositions contain from about 1.5% to 3% ungelatinized starch. Best results are achieved when the starch level is about 2.0% to 2.8%.

Any ungelatinized starch is useful herein. Ungelatinized starch, of course, is starch in the form of granules in contradistinction to gelatinized starch, for example, pregelatinized starch. Starch and its chemistry are well known (see, for example, "Starch: Chemistry and Technology," Vol. 1 & 2, R. L. Whistler and E. F. Paschiall, 1965 & 1967, Academic Press, N.Y., incorporated herein by reference), and selection of suitable starch materials will pose no problem to those skilled in the art. Suitable ungelatinized starches include those derived from cereal grains such as corn, sorghum and wheat; and from roots and tubers including arrowroot, tapioca and potatoes. Highly preferred for use herein as the starch ingredient are thin-boiled starches. Thin-boiled starches are modified starches produced by treating aqueous suspensions of starch granules with mineral acid, and which have been neutralized, washed and then dried.

e. Water

The uncooked blend essentially comprises from about 8% to 60% water. Better comestible bases are prepared when the water is present in the uncooked blend at from about 40% to 55%. Best results are achieved when the water is present in the uncooked blend at from about 45% to 52% by weight.

The water which is added and comprises an essential component of the uncooked blend should, of course, be distinguished from the total moisture content of the uncooked blend. Since the juice vesicles comprise about 90% by weight bound water, the present uncooked blend would have high overall moisture levels even without the addition of the essential water component. However, as noted supra, the water associated with the juice vesicles is so tightly bound as to be unavailable for dissolution of the nutritive sweetening agent(s) or for hydration of the ungelatinized starch.

Conventional potable water can be used to supply the water component of the uncooked blend. Thus, the water of course should be clear, free of objectionable taste, colors and odors, and of approved bacteriological quality.

Preferably, the water component of the process mix is supplied by distilled water. Distilled water is characterized by reduced water hardness, i.e., lower concentrations of magnesium and calcium ions and reduced carbonates level.

The blend is prepared by mixing or blending together in any order the juice vesicles, sweetening agents, acidulants, un-gelatinized starch and water in such a manner as to achieve a uniform blend. Preferably, the sweetening agent and acidulants are first added to water and agitated until dissolved. Thereafter, the vesicles can be added to solution with mild agitation until a relatively uniform blend is achieved. Finally, the starch can be slowly added with more vigorous agitation until thoroughly dispersed to form the process mix. Of course, the blending should be done below the gelation temperature of the starch, i.e., less than about 140° F.

The texture of the blend so prepared and its viscosity depend upon the moisture level of the juice vesicles, the level of starch employed and the amount of water added to the process mix. Typically, however, the viscosity will range from about 3000 to 6,000 cp. when heated to 190° F. as measured by a typical Brookfield viscometer.

Aberrations in viscosity readings due to attachment of some juice vesicles on the spindle of the viscometer can result in erroneous viscosity measurements. Accordingly, an alternate measurement of the consistency of the comestible base is given herein in Bostwick units. The Bostwick consistometer is an instrument commonly used in the food industry to measure the consistency of viscous materials by measuring the distance a material flows under its own weight along a level surface in a given period of time. This instrument is commonly used with food product manufacturers who wish to measure the relative consistency of such products as catsup, jellies, preserves, baby foods, salad dressings and other semi-solid products.

The consistometer comprises a rectangular trough divided in two sections by a spring operated gate assembly. The smaller of the two sections serves as the "reservoir" for the material to be tested. The large section, which takes up most of the trough serves as the "trap" on which the product flows so that its consistency can be measured. This section is graduated along the bottom in 0.5 cm. divisions, beginning at the gate, over a length of 24 cm.

The gate which divides the trough into two sections rests in the grooves of the two posts extending upward from the sides of the trough. Inside each post is a spring sufficiently compressed to maintain a strong upward force on the gate. While the reservoir is being filled, the gate is held down in a closed position. Pressing at the free end of the trigger releases the gate instantaneously and the gate flies up because of the spring force. Upon opening the gate, the fluid material flows along the bottom of the trough. The furthest linear extent of the material flow within a specified time is measured and given in Bostwick units having the dimensions of centimeters. Further information on the Bostwick apparatus and measurement methods is given in "Consistency Tests Made By T. E. A. Garden on Preserves," Western Canner and Packer, February 1939, which is incorporated herein by reference.

The present uncooked blends will have Bostwick flow viscosities between about 10 and 14 when heated to 190° F. As with the alternate viscosity measurement, the Bostwick flow viscosity will depend upon the moisture level of the juice vesicles, the level of ungelatinized starch employed and the amount of water added to the process mix.

II. Cooking

The uncooked blend as prepared above is then cooked in the present method of comestible base preparation. It is speculated herein that during the cooking step numerous complex and interrelated reactions occur including gelatinization of the starch, partial coating of the starch onto the fibrous portions of the juice vesicles, conversion of some insoluble pectin into soluble pectins, solids concentration increase and sugars reduction and conversion. Due to the extremely complex nature of these various reactions, for purposes of the present invention, the cooking step's completion is defined by and determined by two criteria; (1) final moisture content of the comestible base, and (2) the viscosity of the comestible base.

The final moisture content of the comestible bases herein ranges between 30% to 60%. Better results are achieved when the final moisture contents range between 45% and 55%. Best results are achieved when the moisture contents range between 48% and 53%.

Moisture is removed from the blend during the present cooking step. The rate of moisture removal is influenced by the pressure and the temperature at which the cooking step is practiced as well as the starch level and the level of water employed to form the uncooked blend. Generally, longer cooking times are required to achieve the essential final moisture contents of the comestible bases when lower cook temperatures and higher water additions to the uncooked blend are used.

The temperature of the process mix during cooking should range between about 180° F. to 280° F. For better results, the cooking temperature should range from about 205° F. to 280° F. Maintenance of the cooking temperature within the above recited ranges is important to completion of the cooking step within a reasonable time as well as avoidance of ingredient degradation. Maintenance of the cooking temperature within the essential ranges is also important to the various interactions of the process mix components and thus the properties of the present comestible bases.

The cooking step can be performed at atmospheric pressure. Alternatively, the cooking step can be performed under pressure. When pressurized cooking is employed, cooking pressures should be less than about 90 p.s.i.g., and preferably less than about 50 p.s.i.g. Of course, when pressurized cooking is used, the pressure cooking apparatus will be equipped with suitable means for moisture removal.

The combination of high cooking pressures and high cooking temperatures substantially reduces the cooking time required to achieve requisite final moisture contents and viscosities. Accordingly, time, per se, is not a critical process parameter of the present cooking step.

The completion of the present cooking step is also determined by the viscosity of the final comestible base. The viscosity of the cooked comestible bases at 190° F. will range between 7,000 to 10,000 centipoise. For better results, the viscosity will range between about 7,000 and 9,000 cp. Best results are obtained when the comestible base has a viscosity of between about 7,000 and 8,000 centipoise.

The viscosity of the uncooked blend will generally increase during the cooking step by which the present comestible bases are prepared. The final viscosity of the comestible bases is influenced by the amount of juice vesicles used in the process mix as well as the vesicles' moisture content, the level and type of ungelatinized starch employed, the amount of water added to the uncooked blend, the final moisture content of the comestible base and the temperature and time of the cooking step. Generally higher viscosities are obtained when higher amounts of juice vesicles having lower moisture content are used, higher starch levels, longer cooking times at higher temperatures, and lower final moisture levels of the comestible base. Conversely, lower viscosities are obtained when shorter cooking times at lower temperatures, lower starch levels, higher final moisture contents, lower levels of juice vesicles of higher moisture contents are employed.

For convenience, the final viscosities of the cooked comestible bases prepared by the present method of preparation are alternatively stated in Bostwick units. Thus, the comestible bases of the present invention prepared by the present method have Bostwick viscosities of between 7 and 11 at 190° F. Better comestible bases have viscosities of about 7.5 to 10 Bostwick units. For best results, the comestible bases have a viscosity of between about 9.0 and 10 Bostwick units.

B. Whipping Agent

The present frosting compositions essentially contain from about 0.4% to 3% of an acid-stable whipping agent. Better results are obtained when the present compositions contain from about 1% to 2.5% of the whipping agent. By "acid-stable" it is meant herein that the presently employable whipping agents be able to aerate the present frosting compositions, which have a pH ranging from about 2.5 to 5.5, to densities of between about 0.6 to 0.8 g./cc. when the whipping agent is present within the above specified range.

Whipping agents are well known in the food art and selection of suitable materials for use herein as the acid-stable whipping agent will pose no problem to the skilled artisan. Suitable materials can be derived as protein hydrolyzates from, for example, caseinate, whey, (see, for example, U.S. Pat. No. 4,089,987 issued May 16, 1978 to P. K. Chang) and various vegetable proteins. The protein hydrolyzates employed herein are water soluble (i.e., soluble at least to about 20% by weight at 25° C. throughout the pH range of about 2.0 to 10). The soy protein hydrolyzate disclosed in U.S. Pat. No. 3,814,816 (issued June 4, 1974 to R. C. Gunther, incorporated herein by reference) are particularly effective whipping agents. These proteins are commercially available from Staley Mfg. Co., Decatur, Ill., and may be prepared by initially chemically hydrolyzing the soy protein to a prescribed viscosity range and thereafter enzymatically hydrolyzing the soy protein with pepsin to produce a pepsin modified hydrolyzed soy protein whipping agent.

C. Acid-Stable Polysaccharide Gums

The present food compositions also essentially comprise an acid-stable polysaccharide gum. The term "acid-stable" when used herein with reference to the polysaccharide gums indicates that the viscosity of gum dispersions of specified gum level at specified temperature are little effected by the pH of the dispersion. More specifically, the term "acid-stable" is used to indicate that aqueous gum dispersions will vary in viscosity less than about 25% throughout the pH of the present food compositions, i.e., between about 2.5 to 5.5.

The physical and chemical properties of edible polysaccharide gums are well known in the food art and selection of specific acid-stable polysaccharide gums will pose no problem to the skilled artisan (see, for example, "Gum Technology in the Food Industry:," M. Glicksman, Academic Press, N.Y., 1969; "Food Colloids," ed. by H. D. Graham, Avi Publishing Co., Westport, Conn., 1977; and "Industrial Gums," R. L. Whistler 2nd ed., Academic Press, N.Y., 1973; each of which is incorporated herein by reference). Preferred gums for use herein are selected from the group consisting of guar gum, locust bean gum, xanthan gum and mixtures thereof. Best results in terms of mouthfeel, syneresis inhibition and foam stability are realized when the polysaccharide gum is xanthan gum.

The present polysaccharide gums are essentially present in the present frosting compositions at from about 0.1% to 0.5%. Better results are obtained when the gums are present at from about 0.1% to 0.3%. Best results are obtained when the gum levels of the present food compositions are from about 0.1% to 0.2%.

Particular gum utilization levels will depend upon the total moisture in the present compositions, the particular gum(s) employed and the organoleptic properties desired in the present food compositions upon aeration. Generally, however, higher gum utilization levels will be employed with higher compositions moisture contents. Gum levels will also influence the density of the aerated food compositions. Compositions of the present invention containing higher gum levels will generally provide frostings exhibiting lower, fluffier densities upon aeration.

D. Optional Ingredients

The present frosting compositions can optionally contain a variety of additional ingredients suitable for rendering such compositions more organoleptically or aesthetically desirable. Such optional components include, for example, flavors, dyes, coloring agents, vitamins and the like. If present, such minor optional components should comprise from about 0.1% to 2.5% of the frosting compositions.

A preferred optional ingredient is a fruit puree. Employment of fruit purees in the present compositions can desirably impart both natural fruit flavors and colors to realize unique fruit based frostings. Suitable fruit purees are derived from apples, pears, grapes, apricots, peaches, strawberries, blueberries, raspberries and mixtures thereof. If present, such fruit purees can comprise up to about 25% by weight of the present frosting compositions and preferably up to 15%.

Fruit purees typically have high moisture contents, e.g., above 80%. Thus, when fruit purees are added to the present essential frosting ingredients, it is important to control the final moisture content of the frosting compositions in order to prevent syneresis of the aerated frostng. Thus, the frosting compositions should have a total moisture content, including both bound and unbound water, of less than about 60% of the composition, preferably less than about 55%.

Control of the frosting compositions moisture content can be accomplished by controlling the final moisture content of the essential comestible base, and the amount and moisture level of the particular fruit puree employed. Thus, for example, the highest fruit puree levels can be achieved by employing comestible bases having low moisture levels and high starch levels and by using fruit purees having low moisture contents. The moisture contents of the fruit purees can be reduced by drying, for example, to below about 50% by weight without rendering the partially dried fruit purees unsuitable for use herein.

Composition Preparation

The present frosting compositions are prepared by mixing or blending together in any order the comestible base, the whipping agent and the polysaccharide gum as well as any optional components, in such a manner as to achieve a uniform blend.

Packaging

The frosting compositions of the present invention can be prepared and made available to consumers in a variety of forms. For example, a liquid frosting composition can be whipped to form aerated frostings that are ready-to-spread and/or eat. Such "prepared frostings" can be packaged in suitable containers, e.g., a sterilized air-tight can, and then distributed in this form to be used by the consumer without further preparation. More preferably, the liquid frosting composition comprising the comestible base, sweetening agent and suitable whipping agents and polysaccharide gums can be mixed together and packaged in a suitable container, e.g., a sterilized air-tight plastic pouch. The user then merely whips the liquid composition to incorporate air.

Alternatively, a frosting composition comprising a sweetening agent, whipping agent, polysaccharide gum and comestible base can be placed in a pressure-dispensing container from which it can be removed in aerated form. The propellant for the pressure container can be any conventional non-toxic, odorless, tasteless gas including nitrogen, nitrous oxide, carbon dioxide and the like. These containers, conventionally known as aerosol dispensers, can have a dispensing orifice of about 0.03" or less in diameter and the frosting is able to pass therethrough and be whipped during such passage.

Composition Use

The present frosting compositions can be used as edible topping for a wide variety of foods in the same manner as any conventional fluffy frosting or creme icing. The present frostings are stable against foam collapse and syneresis for extended periods.

The frosting compositions of the present composition are illustrated by the following examples:

EXAMPLE I

A frosting composition of the present invention is prepared having the following composition.

| Amount | Ingredient | Weight % |
|--------|-----------|----------|
| 300 g | Comestible base | 99.0% |
| 2.0 | Whipping agent[1] | 0.67% |
| 0.4 | Xanthan gum | 0.13% |
| 0.6 | F.D.&C. Red No. 2 | 0.20% |
| 303.0 g | | 100.00% |

[1]Gunther D-100WA manufactured and sold by A. E. Staley Manufacturing Co. (62% protein, 16% carbohydrate, 24% moisture): a water-soluble soy protein hydrolyzate.

The frosting composition was prepared by mixing together the comestible base, whipping agent and the xanthan gum and color using a Hobart paddle mixer.

The comestible base is prepared in the following manner:

An uncooked blend having the following formulation is prepared:

| Amount | Ingredient | Weight % |
|---|---|---|
| 830 g. | Citrus juice vesicles[1] | 42.8% |
| 620 | Sucrose | 32.0 |
| 41 | Ungelatinized starch[2] | 2.1 |
| 1 | Citric Acid | 0.05 |
| 450 | Water | 23.05 |
| 1,942 g. | | 100.00% |

[1]Juice vesicles obtained from orange juice having an average moisture content of 90% by weight of the juice vesicles.
[2]An ungelatinized modified thin-boiled starch marketed by Hubinger Co. as "Thin-Boil 60"

Such a formulation is prepared by first preparing a dry mix of the sugar, starch and the acid. Then, the unhomogenized juice vesicles are mixed with water in a sauce pan with mild agitation to form a wet mix. The agitation is continued while the dry mix is slowly added to the wet mix. Agitation is continued until the dry mix ingredients are completely dissolved thereby forming an uncooked blend. The blend is then heated with mild agitation to 190° F. A 250 g. sample is taken and analyzed for acidity and for both Brookfield and Bostwick viscosity, and returned to the blend. The pH of the uncooked blend is 4.0 while the Brookfield viscosity was 4000 cps. and the Bostwick viscosity was 14 centimeter (1 min. flow).

The blend is then heated to about 200° F. and cooked in open air to form the comestible base. Samples are periodically withdrawn, analyzed and returned to the blend until the viscosity of the comestible base is about 9,000 cps. at 190° F. Viscosity measurements are taken using a Brookfield HA Viscometer with a No. 3 spindle at 10 RPM. A cooking time of about 40 minutes is required to obtain this viscosity. The comestible base is found to have a Bostwick consistometer value of 9.5 cm. at 190° F. (1.0 min. flow time). The moisture content of the cooked base is determined to be about 50%.

About 1500 g. of the comestible base that is so prepared is then allowed to cool to room temperature before the 300 g. portion is admixed together with the other frosting composition ingredients.

The frosting composition can then be aerated using a kitchen-type mixer at high speed (about 850 RPM) for three to five minutes. The frosting so prepared has a density of 0.7 g./cc. After overnight storage, loosely covered at 75° F. and at 90° F., the frosting did not change in appearance or eating quality.

Frosting compositions of similar physical and organoleptic properties are realized when in the Example I frosting composition the xanthan gum is replaced with an equivalent amount of locust bean gum, guar gum and mixtures of the gums.

EXAMPLE II

A frosting composition of the present invention having the following composition is prepared:

| Amount | Ingredient | Weight % |
|---|---|---|
| 300 g. | Comestible base | 91.2% |
| 20 | Strawberry puree[1] | 6.1 |
| 4 | Whipping agent[2] | 1.22 |
| 0.8 | Guar gum | 0.24 |
| 0.2 | Locust bean gum | 0.06 |
| 0.2 | Zanthan gum | 0.06 |
| 0.5 | F.D. & C. No.2 Red | 0.48 |
| 2.0 | Natural strawberry flavor | 0.61 |
| 328.7 g. | | 100.00% |

[1]A partially dehydrated puree prepared from homogenized whole strawberries having a moisture content of about 30%.
[2]Gunther D-157A manufactured and sold by A. E. Staby Manufacturing Co.: a water-soluble soy protein hydrolyzate.

Such a frosting composition is prepared in a manner similar to that described in Example I except that the comestible base is prepared as described below. The frosting composition is determined to have a moisture content of about 47%.

An uncooked blend having the following formulation is first prepared.

| Amount | Ingredient | Weight % |
|---|---|---|
| 89.82 lb. | Citrus juice vesicles[1] | 44.91% |
| 25.88 | Sucrose | 12.94 |
| 52.82 | Corn Syrup[2] | 26.41 |
| 4.22 | Ungelatinized starch[3] | 2.11 |
| 0.72 | Cream of Tartar | 0.36 |
| 6.10 | Citric Acid | 0.05 |
| 6.10 | Potassium Sorbate[4] | 0.05 |
| 26.52 | Water | 13.26 |
| 200.00 lb. | | 100.00% |

[1]Juice vesicles obtained from orange juice having an average moisture content of 91% by weight of the juice vesicles.
[2]A 71% solids (i.e., 37.6° Be solution)
[3]An ungelatinized wheat starch marketed by General Mills Chemicals, Inc. (a Henkel Corporation) under the name of Aytex.
[4]An optional mold growth inhibition ingredient.

The juice vesicles are first homogenized at about 6,000 psi. using a Cherry Burk homogenizer at 60° F. at a rate of 12 lbs./hr. The homogenized juice vesicles have a consistency similar to a puree.

The homogenized juice vesicles are charged into an open Groen Kettle (apx. 40 gal. capacity) equipped with a swept surface type agitator and a steam jacket. The tap water is added to the kettle using moderate agitation. Thereafter, the corn syrup is added to form a wet mixture.

Then a dry blend comprising the starch, sucrose, cream of tartar, citric acid and potassium sorbate is added to the wet mixture with moderate agitation to form the uncooked blend.

The kettle is heated with low pressure steam until the uncooked blend is 200° F. The viscosity of the uncooked blend is determined to be about 4,200 cps. while the pH is determined to be 4.0.

The blend is then heated to about 240° F. and cooked with moderate agitation to form the comestible base. Samples are periodically withdrawn, analyzed and returned until the viscosity of the comestible base is about 9,500 cp. measured at 190° F. A cooking time of about 2½ hours is required to reach this viscosity. The moisture content of the base is determined to be about 48%. The water activity as measured by a Beckman Model SMT is found to be 0.9. About 150 lb. of comestible base are produced by this procedure. Thus, about 50 lb. of water are removed from the blend during the cooking to realize the present comestible base. The comestible base so prepared can then be combined in appropriate amounts with the other essential and optional frosting ingredients to form the frosting composition.

The frosting composition so prepared can be whipped in a kitchen-type mixer used at high speed to form a strawberry frosting having a density of about 0.6 g./cc. Such a frosting has a natural strawberry flavor while exhibiting the rich mouthfeel of a cream frosting and the light texture of a fluffy frosting.

What is claimed is:

1. A frosting composition substantially free of emulsified oleagineous material, comprising:
   A. from about 90% to 98% by weight of a comestible base prepared by:
      I. blending to form a blend
         a. from about 25% to 65% by weight of the blend of citrus juice vesicles having a moisture content between about 89% to 96% by weight of the vesicles;
         b. from about 7% to 45% by weight of the blend of a nutritive carbohydrate sweetening agent;
         c. sufficient edible non-volatile acid or sodium salt thereof to provide the blend with a pH ranging between about 2.5 to 5.5;
         d. from about 1% to 5% by weight of the blend of an ungelatinized starch;
         e. from about 8% to 60% by weight of the blend of water, said blend having a Brookfield viscosity of between about 3,000 to 6,000 cp. at 190° F.; and
      II. cooking the blend at a temperature of between 180° F. and 280° F. to form a cooked comestible base having;
         a. a moisture content of between about 30% to 60% by weight of the comestible base;
         b. a Brookfield viscosity of between 7,000 and 10,000 cp. at 190° F.;
   B. from about 0.4% to 3% by weight of an acid stable whipping agent; and
   C. from about 0.1% to 0.5% by weight of an acid-stable polysaccharide gum selected from the group consisting of locust bean gum, guar gum, xanthan gum and mixtures thereof.

2. The frosting composition of claim 1 wherein the moisture content of the cooked comestible base component is between about 45% and 55% by weight of the base.

3. The frosting composition of claim 2 wherein the citrus juice vesicles are derived from oranges.

4. The frosting composition of claim 3 wherein the blend contains from about 25% to 45% by weight of the nutritive carbohydrate sweetening agent and from about 1.5% to 3% by weight of the ungelatinized starch.

5. The frosting composition of claim 4 prepared by cooking the blend at a temperature between about 205° F. to 280° F.

6. The frosting composition of claim 5 wherein the citrus juice vesicles are homogenized at pressures of about 1,000 to 8,000 p.s.i.g.

7. The frosting composition of claim 6 wherein the comestible base component has a Brookfield flow viscosity of between about 7,000 to 9,000 cp. at 190° F.

8. The frosting composition of claim 7 wherein the whipping agent is present at from about 1% to 2.5% by weight.

9. The frosting composition of claim 8 wherein the polysaccharide gum is present at from about 0.1% to 0.3% by weight.

10. The frosting composition of claim 9 wherein the edible non-volatile organic acid is selected from the group consisting of citric acid, succinic acid, tartaric acid, malic acid, lactic acid, itaconic acid and adipic acid.

11. The frosting composition of claim 10 wherein the cooked comestible base component has a moisture content of between about 48% to 53% by weight.

12. The frosting composition of claim 11 wherein the blend comprises from about 35% to 42% by weight of the nutritive carbohydrate sweetening agent and from about 2% to 2.8% by weight of the ungelatinized starch.

13. The frosting composition of claim 12 additionally comprising a fruit puree selected from the group consisting of apple puree, pear puree, grape puree, apricot puree, peach puree, strawberry puree, blueberry puree, raspberry puree and mixtures thereof, and wherein the frosting composition's moisture content is less than about 60% by weight.

14. The frosting composition of claim 13 wherein the cooked comestible base component has a Brookfield viscosity of between about 7,000 and 8,000 cp. at 190° F.

15. The frosting composition of claim 14 having a density ranging between about 0.6 to 0.8 g./cc.

16. A process of preparing a frosting which is substantially free of emulsified oleaginous material, comprising the step of whipping, to a density of between 0.6 g./cc. to 0.8 g./cc., a frosting composition comprising:
   A. from about 90% to 98% by weight of a comestible base prepared by:
      I. blending to form a blend
         a. from about 25% to 65% by weight of the blend of citrus juice vesicles having a moisture content between about 89% to 96% by weight of the vesicles;
         b. from about 7% to 45% by weight of the blend of a nutritive carbohydrate sweetening agent;
         c. sufficient edible non-volatile organic acid or sodium salt thereof to provide the blend with a pH ranging between about 2.5 to 5.5;
         d. from about 1% to 5% by weight of the blend of an ungelatinized starch;
         e. from about 8% to 60% by weight of the blend of water,
         said blend having a Brookfield viscosity of between about 3,000 to 6,000 cp. at 190° F.; and
      II. cooking the blend at a temperature of between 180° F. and 280° F. to form a cooked comestible base having
         a. a moisture content of between about 30% to 60% by weight of the comestible base;
         b. a Brookfield viscosity of between 7,000 and 10,000 cp. at 190° F.;
   B. from about 0.4% to 3% by weight of an acid-stable whipping agent; and
   C. from about 0.1% to 0.3% by weight of an acid-stable polysaccharide gum selected from the group consisting of locust bean gum, guar gum and xanthan gum and mixtures thereof.

* * * * *